H. A. ROE.
Cheese Vat.
No. 12,070.
Patented Dec. 12, 1854.
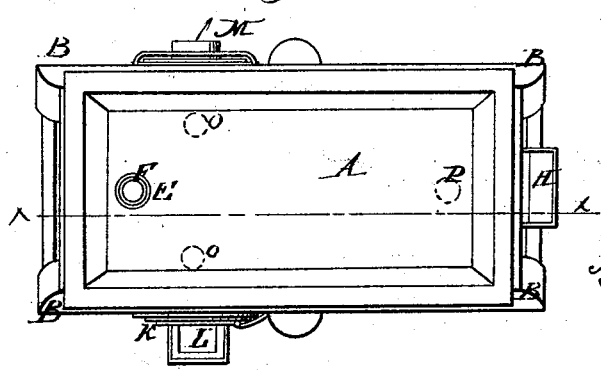
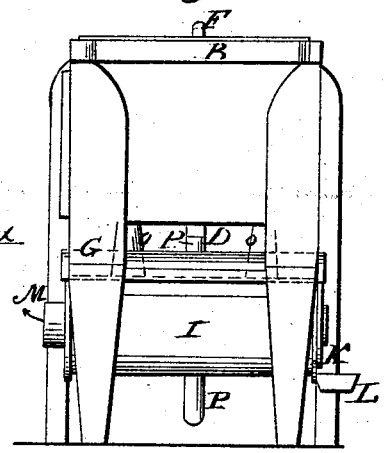
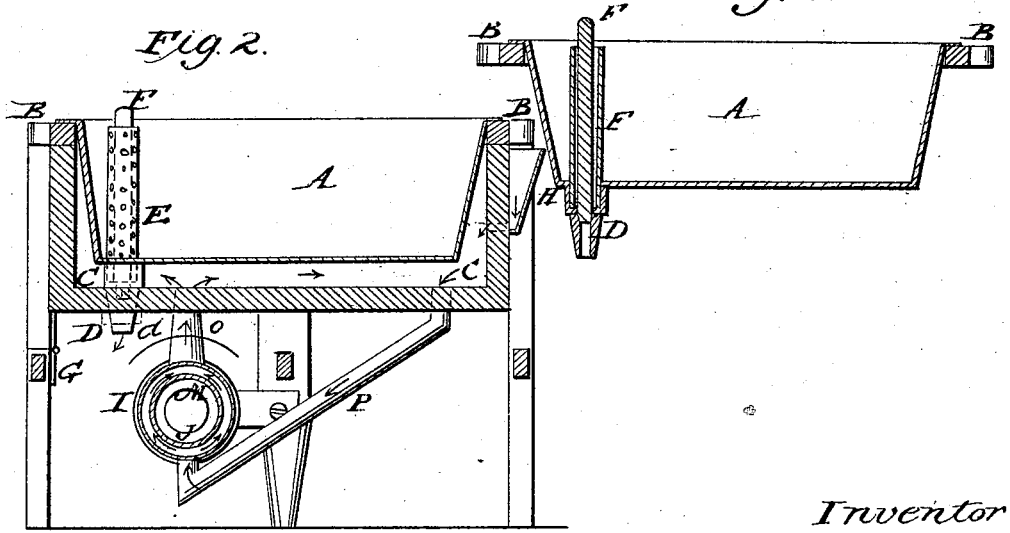
Inventor
Henry A. Roe

UNITED STATES PATENT OFFICE.

HENRY A. ROE, OF WEST ANDOVER, OHIO.

CHEESE-VAT.

Specification of Letters Patent No. 12,070, dated December 12, 1854.

*To all whom it may concern:*

Be it known that I, HENRY A. ROE, of West Andover, in the county of Ashtabula and State of Ohio, have invented certain new and useful Improvements in Cheese-Vats; and I do hereby declare that the following is a full and exact description thereof, reference being had to the accompanying drawings and to the letters of reference marked thereon.

Figure 1 is a top view of my improved cheese vat; Fig. 2, a longitudinal section in the direction of the line $x\ x$, Fig. 1; Fig. 3, an end view, and Fig. 4 a detached section of the vat.

Like letters refer to like parts in the different views.

The vat may be constructed of any desirable size, as the nature of the case may require.

A represents the vat, made of tin, or other suitable material, which is attached to the frame B, this vat is placed in the trough or chamber C, with the discharge pipe D, Figs. 2 and 4, which is attached to the vat, and passes through the lower portion of the chamber C, as seen in Fig. 2, and fitting tight so as not to allow the water to escape; B' B', the outside casing of the vat.

E is a perforated pipe, fitting into the pipe D, as seen in Figs. 2 and 4, inside of which is the plug F, the lower end of which fits tightly into the bore of the pipe D.

When the whey is to be drawn off from the vat A, the plug is withdrawn, and the whey is discharged through the pipe D.

The pipe E is perforated, to prevent the escape of the curd with the whey. The vat is secured in place by hooks attached to the side of the chamber and frame of the vat. I also contemplate using a nut and screw on the pipe at $d$, to aid in securing the vat to the chamber. The vat and chamber may be taken apart when required. Two of the legs which support the vat apparatus, form hinge joints, at G, Figs. 2 and 3, which will allow the vat to dip, sothat all the whey may be perfectly drawn off.

H is a funnel by which the water is conveyed to the chamber C, when the vat A is in place. Under the chamber is secured the boiler I, by any suitable means, in the interior of which is the fire place J, provided with the door K, and hearth L. At the opposite end of the fire chamber, is the chimney or pipe M, and at the top, are two pipes O O, which communicate with the chamber C, and boiler I, so that the water can pass from one to the other. On the underside of the boiler, is the pipe P, which communicates with the chamber C. By this arrangement the heat from the boiler is disseminated uniformly in all parts of the chamber; the cold water descending from the chamber C, to the boiler, through the pipe P, and the heated water passing from the boiler, through the pipes O O, into the chamber, and when is has become cool by passing through the chamber, again passing through the pipe P, to the boiler, from whence, after it becomes heated, it again passes through the pipes O O, into the chamber, and thence back, in the same manner as before. By this means, the milk or card is subjected to a uniform temperature of any degree required; which is not the case when steam is used for heating. The card, at the place where the steam issues, into the chamber, becomes over heated, and at other parts, by the condensation of the steam, is too cold to coagulate well, thus, the quality of the cheese is injured, and some part of the milk wasted. These objections are not attendant upon the use of my improvement.

I do not claim to be the inventor of applying hot water, or steam for heating purposes, but What I do claim as my improvement and desire to secure by Letters Patent, is—

The combination of the boiler I, pipes O O, and P with the chamber C, funnel H, with the vat A, connected with the frame B, arranged in the manner substantially as described and applied to the purpose set forth.

HENRY A. ROE.

Witnesses:
C. M. WILKINS,
P. MEAD.